Dec. 14, 1965  R. H. FULLER  3,223,596
STILL WITH HEATED-AIR CIRCULATION FOR EVAPORATING AND
RECOVERING OF LIQUID SOLVENT
Filed Aug. 30, 1962  2 Sheets-Sheet 1
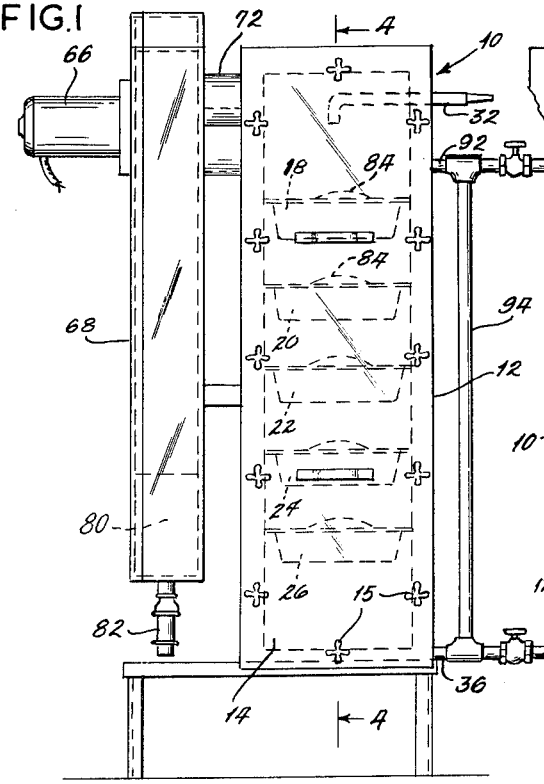
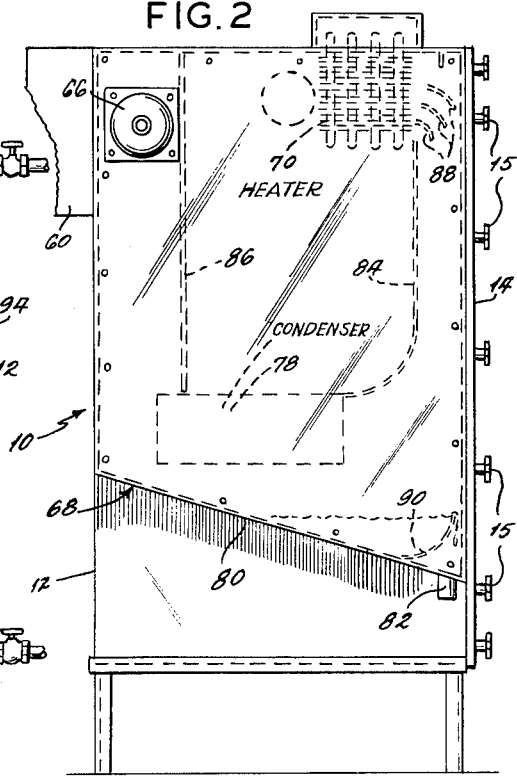
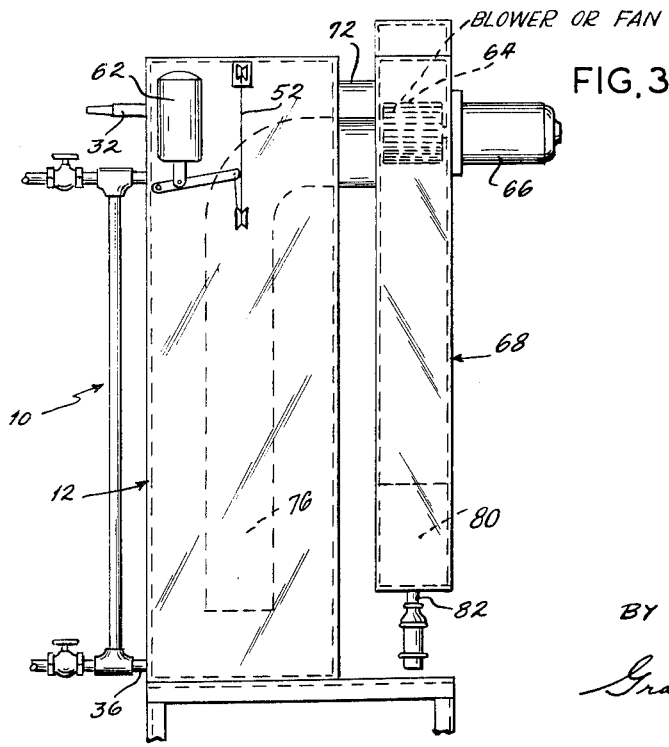
INVENTOR:
BY RICHARD H. FULLER
Gravely, Lieder & Woodruff
ATTORNEYS.

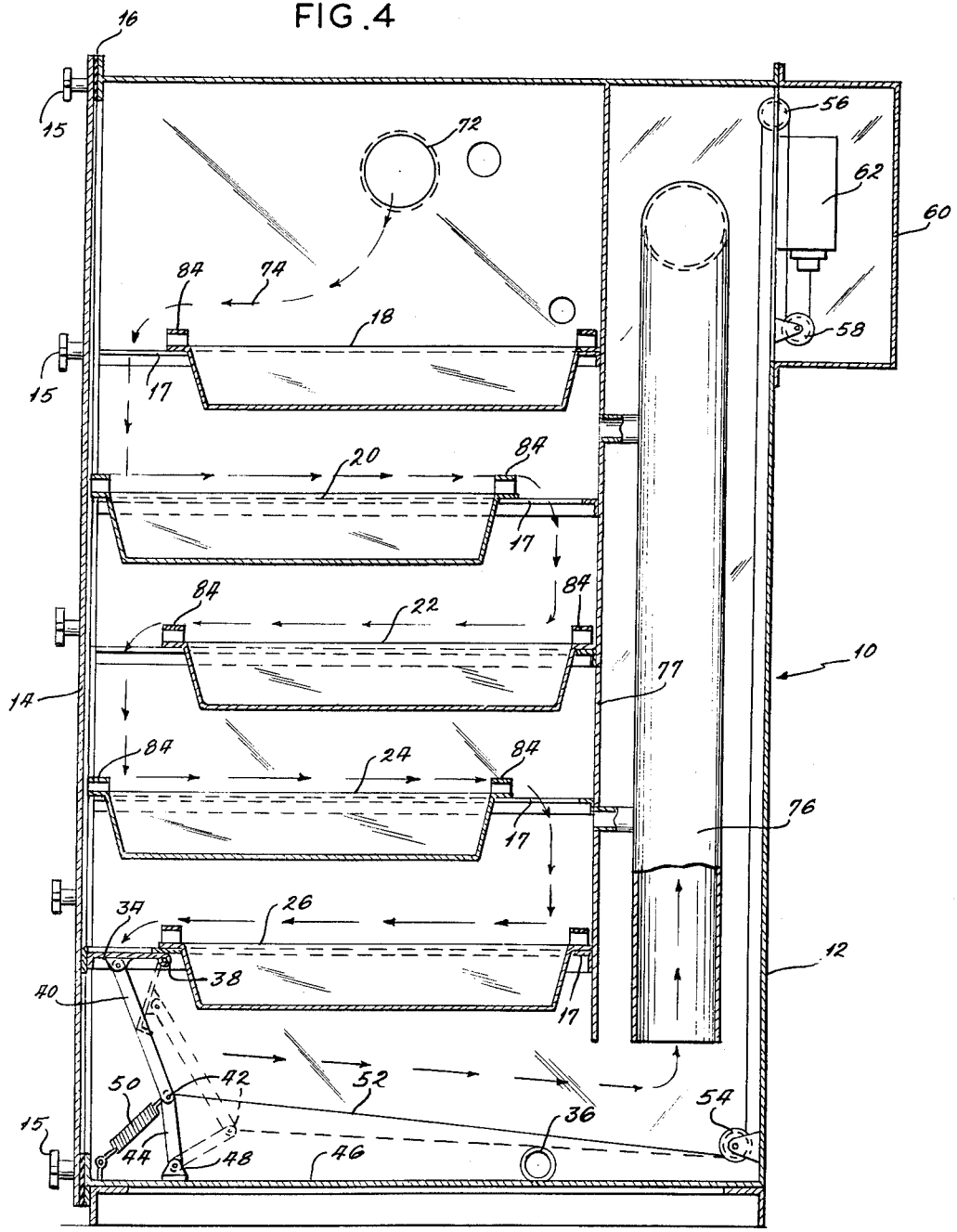

United States Patent Office 3,223,596
Patented Dec. 14, 1965

3,223,596
STILL WITH HEATED-AIR CIRCULATION FOR EVAPORATING AND RECOVERING OF LIQUID SOLVENT
Richard H. Fuller, St. Louis, Mo., assignor to Hammond Industries, Inc., Waco, Tex., a corporation of Texas
Filed Aug. 30, 1962, Ser. No. 220,460
2 Claims. (Cl. 202—201)

The present invention relates generally to dryers and more particularly to devices for drying muck-like material such as the muck that accumulates in dry cleaning filters to recover the liquid solvent contained therein.

Many devices and means have been used in the past to separate and recover liquids from solids, and particularly to recover dry cleaning solvents such as perchlorethylene from the filter muck or sludge that accumulates during dry cleaning. All of the known recovery means and processes, however, have had disadvantages and shortcomings. For example, all known recovery means and processes have been relatively inefficient, expensive to operate and maintain, time consuming, and in all of the known devices and processes the recovery has been relatively low and the left over residue has been relatively difficult and messy to handle and dispose of. Furthermore, all known existing devices for recovering solvent employ steam to vaporize the solvent and this has been undesirable because it has saturated the residue with water and made it heavy and difficult to handle and dispose of. Still further, many installations do not have steam available. These and other shortcomings and disadvantages of the known devices and processes are overcome by the present invention.

The present dryer includes a substantially closed housing with a door on one side. A plurality of vertically spaced trays are positioned inside the housing and are arranged in vertical staggered relationship so that overflow from the topmost tray will flow into the next to the top tray and so on to the bottom tray, means for feeding a wet muck-like material such as the muck that accumulates in a dry cleaning filter to the top tray whereby said material fills said top tray and overflows at one end thereof to each next lower tray and so on until all of the trays are filled, a drain connection at the bottom of the housing for draining excess material back to the filter, an air inlet duct communicating with the housing above the top tray, a fan and a heater element associated with said air inlet duct for moving a mass of warm air into the housing and along a tortuous path back and forth between the staggered trays to evaporate the liquid therein, an outlet air duct having its inlet end adjacent to the bottom of the housing and its outlet end communicating with the inlet side of the fan, and condenser means including liquid accumulating means associated with the outlet air duct for cooling the warm air leaving the housing to condense the evaporated liquid carried thereby.

It is a principal object of the present invention to provide improved means for recovering a fluid contained in a mixture with a solid residue.

Another object is to provide relatively efficient means for recovering dry cleaning solvent from filter muck accumulated in a dry cleaning machine.

Another object is to make it easier, cleaner and safer to handle and dispose of residue material remaining after recovery of a fluid therefrom.

Another object is to provide relatively simple easy to operate means for recovering solvent from a mixture of the solvent and a residue.

Another object is to increase the speed of recovery of a liquid from a mixture thereof with a residue.

Another object is to provide means and process for recovering solvent such as dry cleaning solvent which can be operated by relatively unskilled personnel.

Another object is to separate a liquid from a mixture with a solvent leaving the solid residue in a relatively dry condition.

Another object is to provide an air tight liquid recovery device.

These and other objects and advantages of the present invention will become apparent after considering the following detailed description of a preferred embodiment of the device in conjunction with the accompanying drawings, wherein:

FIG. 1 is a front elevational view of a dryer constructed according to the present invention;

FIG. 2 is a side elevational view of the dryer as seen from the left in FIG. 1;

FIG. 3 is a rear elevational view of the dryer of FIGS. 1 and 2; and

FIG. 4 is a cross-sectional elevational view taken on line 4—4 of FIG. 1.

Referring to the drawings by reference numbers, number 10 refers to a dryer constructed according to the present invention. The dryer 10 includes a housing 12 which is closed on three sides and on top and bottom, and has a door 14 on the remaining side for access. The door 14 is secured to the housing in air tight condition by a plurality of handles 15 and a sealing gasket 16.

A plurality of vertically spaced support flanges 17 in the form of angle members are attached to the inside walls of the housing and extend around the inside periphery thereof. The supports 17 may be mounted slightly at an angle to the horizontal from end to end with alternate supports angled oppositely relative to the horizontal for reasons which will be shown.

A plurality of trays 18, 20, 22, 24 and 26 each having a flanged peripheral edge are positioned in the housing with the flanged peripheral edges resting respectively on the support member 17 as clearly shown in FIGS. 1 and 4. The trays 18-26 are arranged in the housing 12 in vertical staggered positions so that every other tray is against the back wall of the housing and the inbetween trays are against the front wall or door 14. With the support members 17 off horizontal, as aforesaid, the trays are arranged to have their lower ends spaced from the housing or door to overflow into the tray immediately therebelow. If desired the overflow ends of the trays can also be formed as spouts to facilitate the overflow.

An inlet conduit 32 for filter muck is connected to the housing 12 at a location above the top tray 18 (FIG. 1). The conduit 32 has its opposite end connected to a source of sludge or filter muck on a dry cleaning machine or the like (not shown). During operation of the subject dryer, filter muck which consists of dry cleaning solvent mixed with dirt and other foreign matter is agitated and then fed through the inlet conduit 32 into the top tray 18. The agitation of the muck is usually necessary to cause the muck to go into suspension and to flow easily. The agitated muck is pumped through the conduit 32 to the top tray 18 and this continues until the top tray is full and thereafter overflows into the next tray and so on until all of the trays are full. If there is still more muck, the excess will continue to accumulate in the housing above the bottom tray 26. This is so because the space between the free end of the bottom tray and the door 14 is closed by a gasket lined trap door or closure member 34. Subsequently, when the device 10 is operated, the trap door 34 will be opened and the excess solvent, which at this point is relatively muck free will flow back to the dry cleaning machine through a return conduit 36 adjacent to the bottom of the housing. A residue of muck is left distributed on the five trays 18-26 in the dryer, and it is one of the main purposes of the subject machine to recover the solvent contained in this muck. The dryer 10 is electrically operated and is now ready to be turned on.

Before considering what happens when the dryer is energized it would be well to consider the rest of its structure. As already noted, the closure member 34 is in position closing the space between one end of the tray 26 and the door 14. The closure member 34 is hinged at 38 and is also pivotally connected to one end of a link member 40. The opposite end of the link 40 is pivotally connected at 42 to another link 44. The link 44 has its opposite end pivotally connected to the bottom wall 46 of the housing 12 at 48.

The pivotal connection 42 between the links 40 and 44 is connected by a spring 50 to the housing and normally maintains the links 40 and 44 in the solid line positions illustrated in FIG. 4. In this position the closure member 34 closes the space between the end of the tray 26 and the cover 14. The pivot connection 42 between links 40 and 44 is also connected by a cord 52 which extends around pulleys 54, 56 and 58 and into a control housing 60. The opposite end of the cord 52 is connected to a trap door motor or solenoid 62. The motor 62 is energized by energizing the dryer and pulls the cord 52 causing the links 40 and 44 to collapse into the position shown in the dotted outline in FIG. 4. This opens the trap door 34 and allows the overflow from tray 26 to drain to the conduit 36. Even more important, when the trap door 34 opens it also establishes a path for circulating air through the dryer as will be shown.

The air circulation means includes a fan 64 driven by a fan motor 66. The fan 64 and motor 66 are mounted in a separate housing 68. The output air from the fan 64 blows across a heating coil 70 and through an air conduit 72 that communicates with the housing 12 above the top tray 18. This air which has been heated by the coils 70 flows along a path 74 identified by the arrows in FIG. 4. It is important to note that the warm air follows a tortuous path that comes in contact with both sides of all the trays. After the warm air has moved across the top of the bottom tray 26 it flows through the opening caused by the opening of the trap door 34 and thereafter is sucked into an outlet conduit 76 which is positioned in a compartment of the housing 12 separated from the rest of the housing by a baffle wall 77. The warm air is now heavy laden with solvent evaporated from the trays during its movement between the trays.

The heavy laden warm air enters the separate housing 68 near the upper rear corner thereof (FIG. 2), and moves downwardly, frontwardly and finally upwardly to the inlet side of the fan 64. In so moving the warm air passes through a condenser unit 78 which may consist of a plurality of cold water coils. As the saturated warm air moves past the condenser 78 it is cooled and its liquid content falls out. The liquid accumulates on a sloping bottom wall 80 of the housing 68 and drains off through an outlet conduit 82 (FIG. 2). Thereafter the same air again passes through the fan 64 and the heater 70 and is recirculated.

The process is continuous until all of the solvent has been evaporated and condensed out or recovered at which time the machine is turned off. After the machine is off the door handles 15 are loosened and the door 14 removed. The trays are then accessible for removal in order to dispose of the dry residue. The dry residue is relatively easy and safe to handle and can be disposed of even in regular waste containers. Furthermore, by being able to remove the trays individually the process is further simplified and can be accomplished even more easily and with less mess. Heretofore, there has been no clean and easy way to handle and dispose of filter muck residue because it has always been in a heavy moist condition. It should also be noted that by moving a stream of warm air in contact with both the top and the bottom of each tray the rate of evaporation is greatly increased and the time required for solvent recovery is substantially reduced. Furthermore, by warming both sides of the trays more complete evaporation is possible because the muck is more thoroughly warmed.

Each of the trays 18–26 is also provided with handles 84 at the ends thereof to facilitate their removal and replacement. Each tray may also be provided with a screen cover (not shown).

The dryer 10 is also provided with conduit means (not shown) for feeding and circulating cold water through the coils of the condenser 78. The cold water supply can be controlled by suitable solenoid operated valve means.

The inside of the separate housing 68 is also provided with baffle walls 84 and 86 (FIG. 2) and baffles 88 and 90. These walls control and guide the flow of air therethrough and also separates the air stream from the solvent that accumulates at the outlet conduit 82.

The dryer 10 also has an overflow conduit 92 which is connected to the drain conduit 36 by a sight glass tube 94. The sight glass enables visual inspection of the fluid level in the dryer.

The dryer 10 can be turned on and off by a single switch. In some cases, however, it may be desirable, and it is anticipated to use more sophisticated controls to make the operation automatic. Both type of controls are fully anticipated and are clearly within the scope of the invention. If an on-off switch is employed, it will do four things to place the device in operation as follows: it will actuate the motor or solenoid 62 to open the trap door 34; it will energize a solenoid to feed cold water to the condenser 78; it will turn on the heating coils in the unit 70 to heat the air entering the housing 12; and it will energize the motor 66 to drive the fan 64. A single-throw four-pole switch can be used to accomplish these things.

Thus there has been shown and described a novel dryer and drying process which are particularly well suited for recovering a liquid such as dry cleaning solvent from a mixture thereof with a residue, which dryer and drying process fulfill all of the objects and advantages sought therefor. Many changes, modifications, variations of the subject dryer and process will become apparent to those familiar with the art after considering this specification and the accompanying drawings. All such changes, modifications and variations which do not depart from the spirit and scope of the invention are deemed to be covered by the invention which is limited only by the claims which follow.

I claim:

1. Means for recovering dry cleaning solvent from a mixture with filter muck that accumulates during a dry cleaning process comprising a housing having top and bottom portions and an access door, a plurality of vertically spaced, filter muck retention trays removable through said access door positioned in staggered vertical relation in said housing with opposite ends of adjacent trays being spaced from the housing forming a tortuous air flow path that extends back and forth across the housing between adjacent trays from the top to the bottom portion of the housing, means for feeding an excess quantity of filter muck to the uppermost tray whereby the amount in excess of what the uppermost tray will hold overflows into the next lower tray and so on to the bottom tray, means for circulating air along the air flow path between adjacent trays, said air circulating means including a blower having compression and suction connections communicating respectively with the top and bottom portions of the housing for moving a mass of air along said tortuous air flow path whereby the air simultaneously communicates with the top of one of said trays and the bottom of another of said trays, heater means positioned in the compression connection of the blower to warm the air mass entering the housing to evaporate solvent contained in the trays, cooler means positioned in the suction connection to condense the solvents carried by the solvent laden warm air leaving the housing, means for accumulating the condensed solvents, and a movable closure member for closing the space above the bottom-most tray and the housing and means operably connected to said closure member for moving said member to a position opening said space.

2. A machine for recovering liquid from a mixture thereof with a non-liquid by evaporation and condensation leaving the non-liquid residue in a relatively dry condition comprising a housing of air tight construction with an access door on one side, said housing having a plurality of vertically spaced peripheral shelves therein, a coresponding number of residue retention pans removable through said access door each supported respectively on one of said shelves, adjacent pans having opposite side edges spaced from the housing to form a circuitous air flow path which extends back and forth between adjacent pans and around the side edges thereof that are spaced from the housing, means for feeding an excess quantity of a mixture of a liquid and a non-liquid to the uppermost pan whereby the amount in excess of the capacity of the uppermost pan overflows to the next highest pan and so on to each lower pan down to the bottommost pan, means for circulating a stream of warm air along the circuitous path between the uppermost and bottommost pans whereby the air simultaneously communicates with the top of one of said trays and the bottom of another of said trays, said air circulating means including a fan having an output connection and a suction connection, one of said connections communicating with the housing adjacent to the uppermost pan and the other communicating with the housing adjacent to the bottommost pan, a heater element in the output connection, a cooler element in the suction connection, means for simultaneously energizing the fan, the heater element and the cooler element, a movable closure member positioned adjacent the bottommost pan to close the space above the bottommost tray and the housing, and means normally biasing said closure member into a position closing the space between the bottommost pan and the housing, and means for moving said closure member to a position opening said space simultaneously with the energizing of the fan.

References Cited by the Examiner
UNITED STATES PATENTS

| | | | |
|---|---|---|---|
| 188,576 | 3/1877 | Bowers | 159—15 |
| 319,956 | 6/1885 | Cloudman | 159—15 X |
| 497,857 | 5/1893 | Bullock | 202—46.1 X |
| 716,462 | 12/1902 | McElheny | 34—171 X |
| 1,277,895 | 9/1918 | Foster | 34—77 X |
| 1,317,688 | 10/1919 | Davenport | 202—46 |
| 1,381,002 | 6/1921 | O'Neil | 202—48 X |
| 1,472,314 | 10/1923 | Webster | 34—171 X |
| 1,775,699 | 9/1930 | Silver | 34—77 X |
| 1,871,773 | 8/1932 | Bennett | 34—171 X |
| 2,226,828 | 12/1940 | Moran | 202—236 X |
| 3,003,930 | 10/1961 | Pugh et al. | 159—15 X |

NORMAN YUDKOFF, *Primary Examiner.*